(12) United States Patent
De Groote et al.

(10) Patent No.: US 7,577,735 B1
(45) Date of Patent: Aug. 18, 2009

(54) TRANSPARENT MODE

(75) Inventors: Stephen P. De Groote, Maple Grove, MN (US); Mark A. Bakke, Maple Grove, MN (US); Bonny Parker, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 697 days.

(21) Appl. No.: 10/306,144

(22) Filed: Nov. 27, 2002

(51) Int. Cl.
*G06F 15/173* (2006.01)

(52) U.S. Cl. .................... 709/224; 709/246; 709/250

(58) Field of Classification Search ............... 709/246, 709/250, 244, 224
See application file for complete search history.

(56) References Cited

U.S. PATENT DOCUMENTS

| | | | |
|---|---|---|---|
| 6,138,161 A * | 10/2000 | Reynolds et al. ............ | 709/227 |
| 6,199,112 B1 * | 3/2001 | Wilson ....................... | 709/227 |
| 6,848,007 B1 * | 1/2005 | Reynolds et al. ............ | 709/245 |
| 6,934,799 B2 * | 8/2005 | Acharya et al. ............. | 711/112 |
| 7,051,147 B2 * | 5/2006 | Hoese et al. ................ | 710/305 |
| 2003/0225735 A1 * | 12/2003 | Weber ........................... | 707/1 |
| 2003/0225859 A1 * | 12/2003 | Radia et al. .................. | 709/219 |
| 2004/0022256 A1 * | 2/2004 | Green ......................... | 370/401 |
| 2006/0155853 A1 * | 7/2006 | Nesz et al. .................. | 709/227 |

\* cited by examiner

*Primary Examiner*—John Follansbee
*Assistant Examiner*—Nghi V Tran
(74) *Attorney, Agent, or Firm*—Schwegman, Lundberg & Woessner, P.A.

(57) ABSTRACT

A method, system, apparatus, and signal-bearing media for provided discovering a target device via one port of a plurality of virtual ports, creating a target data structure associated with the target device, and allocating a second port of the plurality of virtual ports to a host if the second port is available. In an embodiment, an initiator identifier for the host may be created based on a port number of the second port and a media access control address and sent to the target device to identify the host.

35 Claims, 5 Drawing Sheets

TRANSPARENT MODE

FIELD OF THE INVENTION

This invention relates generally to networks of computers and more particularly to accessing a device at a remote computer via a network.

BACKGROUND OF THE INVENTION

Computer systems need a way to store and retrieve data from a variety of data devices, such as disk drives, printers, display screens, and scanners. In the past, each computer typically had its own directly-attached devices, which no other computer was capable of using. But, this was a cumbersome and expensive design because sharing data among computers was difficult and a particular device might stay idle and unused for lengthy periods.

In order to overcome the aforementioned problems, computers are connected in networks, and one computer (often called a client or a host) is allowed to store and retrieve data from another computer's (often called a server) devices. Since many clients or hosts (initiators) may wish to access the same device, the device needs a way to distinguish the initiators from each other so that, for example, if one initiator is issuing a write command to a tape device, another initiator is not allowed to issue a rewind command to the same tape device. Prior devices have attached to multiple physical ports at a server with different initiators allocated to different physical ports. But, multiple physical ports require duplicate hardware, which is expensive. What is needed is a less expensive solution that allows a device to distinguish between multiple initiators.

SUMMARY OF THE INVENTION

The present invention provides solutions to the above-described shortcomings in conventional approaches, as well as other advantages apparent from the description below. A method, apparatus, system, and a signal-bearing medium are provided for discovering a target device via one port of a plurality of virtual ports, creating a target data structure associated with the target device, and allocating a second port of the plurality of virtual ports to a host if the second port is available. In an embodiment, an initiator identifier for the host may be created based on a port number of the second port and a media access control address and sent to the target device to identify the host.

DETAILED DESCRIPTION OF THE INVENTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
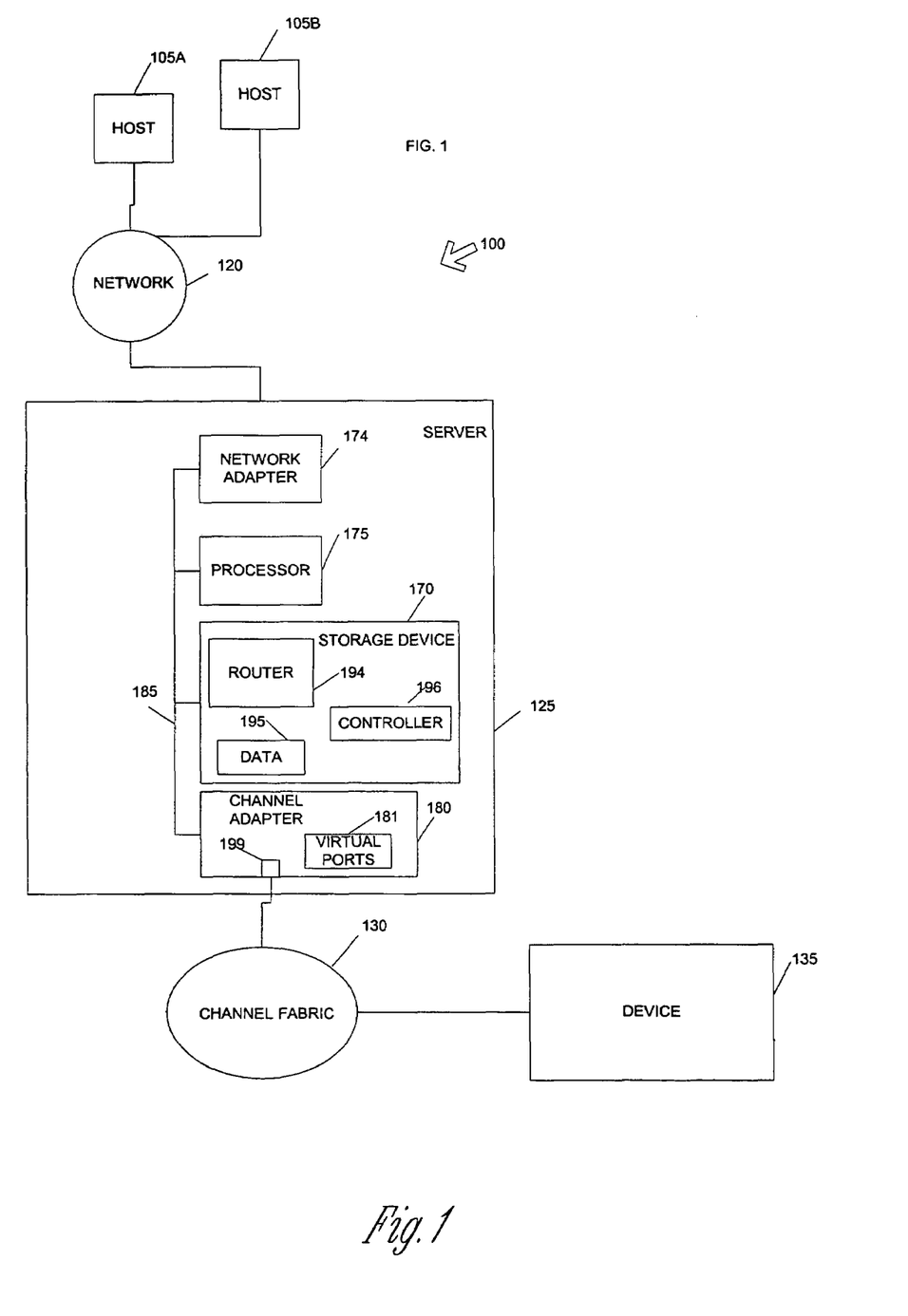
FIG. 1 depicts a block diagram of a system that may be used to implement an embodiment of the invention.

FIG. 1 depicts an example system 100, including a network of computer systems and devices that may be used to implement an embodiment of the invention. Hosts 105A and 105B are communicatively coupled to a network 120. The network 120 is communicatively coupled to a server computer 125, which is communicatively coupled to a channel fabric 130, which is communicatively coupled to a device 135.

The hosts 105A and 105B may be computers or other electronics devices that wish to store and/or retrieve data to/from the device 135. Although two hosts 105A and 105B are shown, in other embodiments any number of hosts may be present.

The network 120 may include many servers and/or many clients, which act to pass information between them. Networked systems often follow a client/server architecture. In an embodiment, a client is a process (i.e., a program or task) executing on a computer that requests a service provided by another program or computer. In another embodiment, the client is the computer itself. The client utilizes the requested service without needing to know any working details about the other program or the service itself. In networked systems, a client is usually a computer that accesses shared network resources provided by another computer, such as server.

In an embodiment, the network 120 utilizes the TCP/IP protocol. TCP/IP is an acronym for "Transport Control Protocol/Internet Protocol," a protocol developed by the Department of Defense for facilitating communications between computers. In an embodiment, iSCSI protocol commands are sent through the network 120 using TCP/IP. iSCSI is a protocol for sending SCSI (Small Computer System Interface) commands over the Internet. SCSI is a standard high-speed parallel interface defined by the X3T9.2 committee of the American National Standards Institute (ANSI). In other embodiments, any appropriate protocol or combinations of protocols may be used.

The network 120 provides the hosts 105A and 105B with a means of electronically communicating information, including software, with a remote computer or a network logical-storage device. In addition, the network 120 may support distributed processing, which enables the hosts 105A and/or 105B to share a task with other computer systems linked to the network. The network 120 may include a plurality of networks, each of which could include a plurality of individual computers. The hosts 105A and 105B and the server 125 may be connected directly to the network 120 via a standard telephone line, a dedicated cable, a wireless communications link, or may be connected indirectly to the network 120 via another network or a client and/or another server.

The server 125 may be a computer remote from the hosts 105A and/or 105B over the network 120. Based on requests from the hosts 105A and 105B, the server 125 may store and/or retrieve data to/from the device 135.

The server 125 may include a storage device 170, a network adapter 174, a processor 175, and a channel adapter 180, which are all connected via a system bus 185.

The storage device 170 may be any type of computer memory, volatile or non-volatile. In an embodiment, the storage device 170 may be one or more hard disk drives. In another embodiment, the storage device 170 may be ROM (read only memory), a tape drive, a diskette drive, a CD-ROM drive, or any device or combination of devices capable of storing instructions and data. Although the storage device 170 is shown incorporated into the server 125, in other embodiments, it may be external to the server 125, e.g., either connected directly, on a local area network (LAN), or on the network 120.

The storage device 170 may include a router 194 and a controller 196, which include instructions capable of being executed by the processor 175. In another embodiment, the router 194 and/or the controller 196 may be implemented by control circuitry though the use of logic gates, programmable logic devices, or other hardware components in lieu of a processor-based system. Although the router 194 and the controller 196 are shown contained within the storage device 170, in another embodiment, they may be part of the channel adapter 180. Operations of the router 194 and the controller 196 are further described below with reference to FIGS. 2, 3, 4, and 5.

Although only one router 194 is shown, multiple router instances may exist, each with its own network address, e.g., its own IP address on the network 120. A router instance processes commands between the network adapter 174 and the channel adapter 180.

The storage device may further include data 195, which may include data structures representing the device 135 and the status of connections to the device, as further described below with reference to FIG. 2.

The processor 175 may be any type of computer processor. The processor 175 accesses data and instructions from and stores data to the storage device 170. The processor 175 executes instructions and includes that portion of the server 125 that controls the operation of the entire computer system, including executing the arithmetical and logical functions contained in a particular computer program. The processor 175 organizes data and program storage in the storage device 170 and transfers data and other information between the various part of the computer system. Although the server 125 is shown to contain only a single processor and a single system bus, the present invention applies equally to computer systems that have multiple processors and to computer systems that have multiple buses that each perform different functions in different ways.

The server 125 may be implemented using any suitable computer such as a Cisco SN5420 Universal Access Server or the Cisco SN5428 Universal Access Server. Portable computers, laptop computers, and network computers or Internet appliances are other possible configurations. The hardware depicted in FIG. 1 may vary for specific applications. For example, other peripheral devices such as optical-disk media, audio adapters, or chip programming devices, such as PAL or EPROM programming devices may be used in addition to or in place of the hardware already depicted. Thus, an embodiment of the invention may apply to any hardware configuration that allows attachment of devices, regardless of whether the hardware configuration is a complicated, multi-user computing apparatus, a single-user workstation, or a network appliance that does not have non-volatile storage of its own.

In an embodiment, the server 125 acts as a gateway between the host 105A and/or 105B and the device 135.

The channel adapter 180 includes virtual ports 181 and a physical port 199. The physical port 199 is connected to the channel fabric 130.

The channel fabric 130 may transfer data between the server 125 and the device 135. In an embodiment, the channel fabric 130 may be implemented using the Fibre Channel I/O (Input/Output) protocol. Fibre Channel is an asynchronous, serial I/O protocol that is unaware of the content or meaning of the information being transferred. In other embodiments, any suitable I/O protocol may be used, such as the SCSI (Small Computer System Interface) or IDE (Integrated Device Electronics) protocols. Although the channel fabric 130 is shown as being separate from the server 125, in another embodiment the channel fabric 130 may be packaged as part of the server 125.

The device 135 may be any I/O (input/output) device, such as a workstation, hard disk drive, disk array, diskette drive, CD-ROM drive, DVD (Digital Video Disc) drive, tape drive, scanner, medical instrument, or any other device capable of receiving and/or sending data. Although only one device 135 is shown, in another embodiment multiple devices may be present. Further, the device 135 may include multiple, separately addressable logical units. For example, one device may include an array of separately addressable disk drives or multiple tape drives.

In an embodiment of the system 100, a user or software application at the hosts 105A and/or 105B may issue a command to store or retrieve data on the device 135. The request is converted into one or more SCSI commands and/or data and encapsulated by representing them as a serial string of bytes proceeded by iSCSI headers. The encapsulated data is broken up into packets suitable for transfer over the network according to the TCP/IP protocol and sent over the network 120. The server 125 (e.g., an instance of the router 194) recombines the packets into the original encapsulated SCSI commands and data. The server 125 then converts the SCSI commands and data into Fibre Channel commands and sends them across the channel fabric 130 to the device 135, which performs the functions that were originally requested by the hosts 105A and/or 105B.

Although the system 100 has been described in the context of TCP/IP, Fibre Channel, and iSCSI, any suitable protocols may be used. For example, in another embodiment, SCSI or IDE may be used instead of Fibre Channel for some or all of the interfaces between the hosts 105A and 105B, the server 125, and the device 135.

Although the various components of FIG. 1 are drawn as single entities, each may consist of multiple entities and may exist at multiple levels.

As will be described in detail below, aspects of an embodiment pertain to specific methods implementable on computers. In another embodiment, the invention may be implemented as a computer program product for use with a computer system. The programs defining the functions of the embodiment may be delivered to a computer via a variety of signal-bearing media, which include, but are not limited to:

(1) information permanently stored on a non-rewriteable storage medium (e.g., a read only memory device within a computer such as a CD-ROM disk) readable by a CD-ROM drive;

(2) alterable information stored on a writeable storage medium (e.g., a hard disk drive or diskette); or (3) information conveyed to a computer by a communications medium, such as through a computer or telephone network including wireless communications.

Such signal-bearing media, when carrying computer-readable instructions that direct the functions of the present invention, represent embodiments of the present invention.

Figure 2:
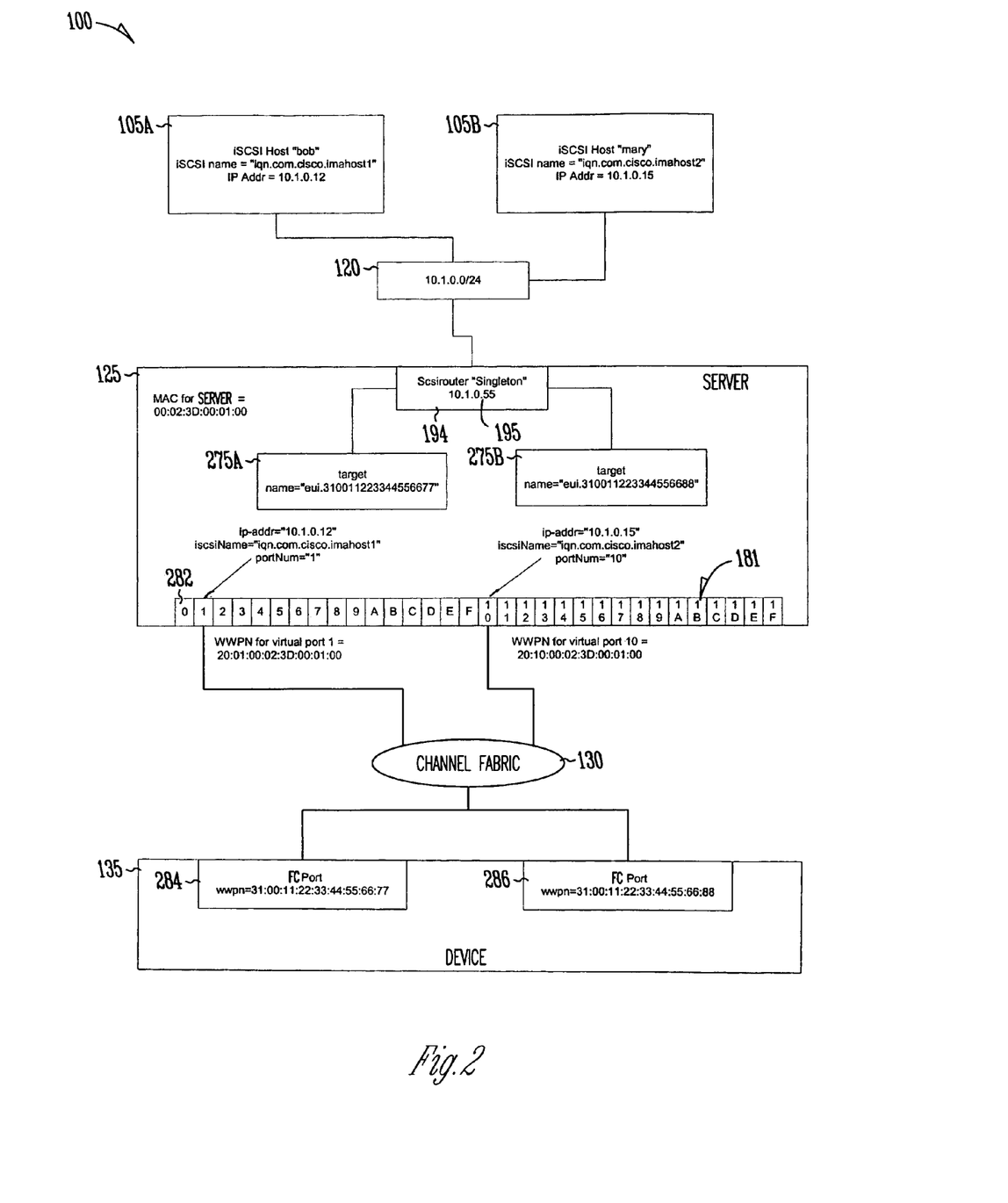
FIG. 2 depicts a block diagram of system with example data that may be used to implement an embodiment of the invention.

FIG. 2 depicts a block diagram of the system 100 with example data that may be used to implement an embodiment of the invention. The data illustrated is exemplary only and any appropriate data may be used. The targets 275A and 275B may be data structures included in data 195 (FIG. 1) that represent attached devices, such as the device 135. Although two targets 275A and 275B are shown, any number may be present.

The controller 196 (FIG. 1) creates the router instance 194 and assigns it a network address 195. In an embodiment, a user may supply the network address 195, but in another embodiment the network address 195 may be generated via any appropriate means.

In an embodiment, virtual ports 181 may include 32 virtual fibre channel ports labeled 0-1F, which may be used for fibre channel initiators, but in another embodiment any number of virtual ports may be present, any appropriate labeling scheme may be used, and any appropriate protocol may be used. In an embodiment, virtual port 282 is not available for use by a host external to the server 125 since the server 125 uses virtual port 282 to discover targets attached to the channel fabric 130. In another embodiment, any appropriate port within virtual ports 181 may be used to discover targets. In an embodiment, ports 1 through 1F are available to initiators. The router instance 194 constructs a virtual port name, which in an embodiment is a WWPN (World Wide Port Name). In an embodiment, the router instance 194 may construct the virtual port name by concatenating byte 0x20+<port number>+6 byte MAC (Media Access Control) address (total of 8 bytes). But, in another embodiment, the virtual port name may be any appropriate length in any appropriate format. In an embodiment, a value of 0x20 in the first byte indicates that the lower 6 bytes of the 8 byte WWPN comply with the specification for an IEEE (Institute of Electrical and Electronics Engineers) MAC address.

When the router 194 discovers target devices, the router 194 creates a target data structure (e.g., target 275A or 275B) that represents the discovered target device. In the example shown, the target name is "eui." followed by the WWPN of the target's port. Thus, in the example shown, for a target discovered at WWPN 31:00:11:22:33:44:55:66:77 (element 284), the target name (shown within target 275B) is "eui.310011223344556677". Likewise, for a target discovered at WWPN 31:00:11:22:33:44:55:66:88 (element 286), the target name (shown within target 275B) is "eui.310011223344556688". In an embodiment, the router 194 sets the access list for the target to "all." In another embodiment, the router 194 may allow the user to specify a default access list value.

When a host logs in to a target, the router 194 determines if the host is static, i.e., assigned to one of the virtual ports. If so, the router 194 assigns the host to that virtual port and the initiator at that virtual port attempts to log in to the target. If the host is not static and a virtual port is available, the host is assigned to that virtual port and attempts to log in to the target.

The router 194 may support commands to a port configuration or clear an existing port configuration. In another embodiment, a command may be set to "on" or "off." When "on," any host that logs into the server 125 is assigned to a virtual initiator port and is added to the configuration tree. When "off," the host will not be added automatically.

The following set of commands supports static assignment of hosts to specific virtual initiator ports:

A command to add the current host assignments for the virtual ports to a configuration tree and delete any existing initiator map.

A command to add a host to a virtual port selected by the server 125 and assign an alias.

A command to add a host to a virtual port assigned by the command issuer.

A command to add a host, including an iSCSI name, to a virtual port specified by the command issuer.

A command to delete all host assignments from the virtual ports.

A command to remove a host from a virtual port.

A command to display the current host assignments for the virtual port name including non-static host currently logged into the server 125.

A command to display all static virtual port assignments.

Figure 3:
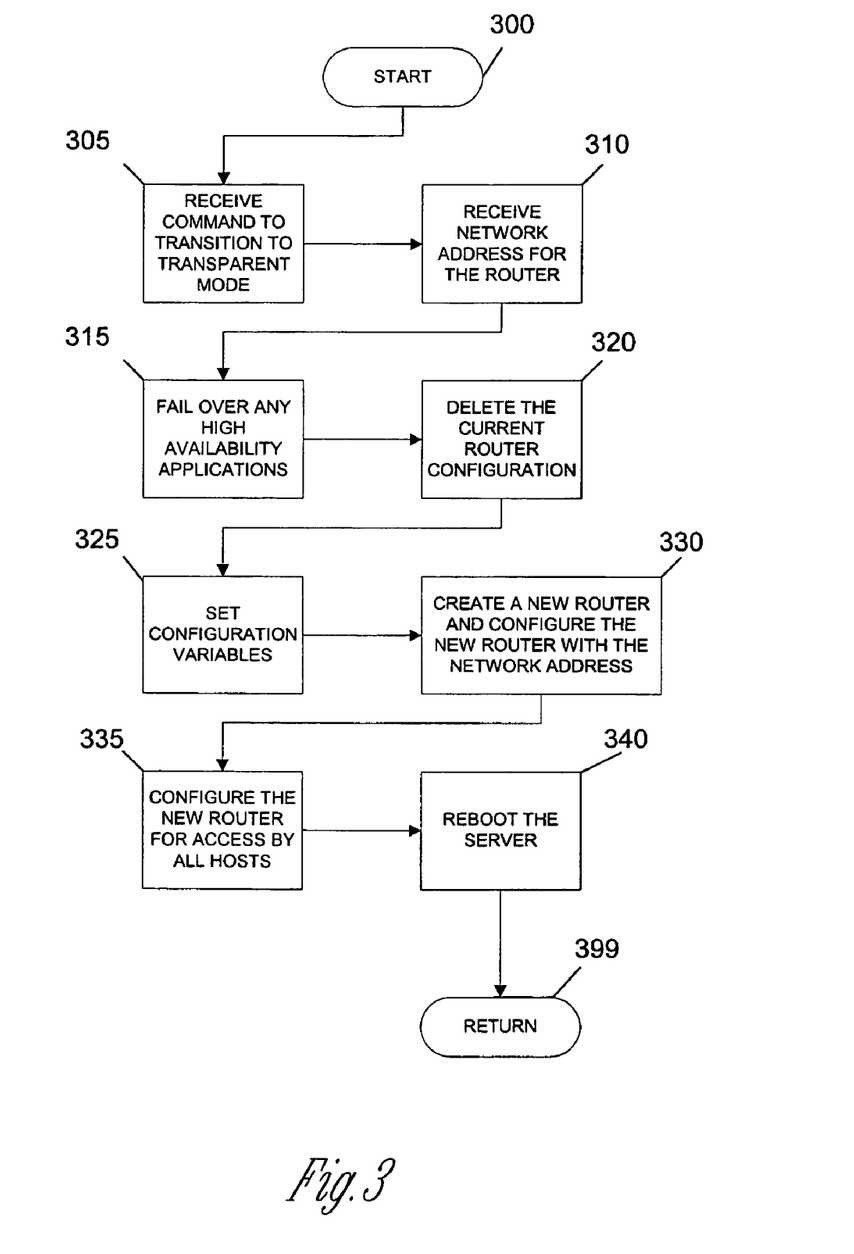
FIG. 3 depicts a flowchart that describes the operation of a function that transitions a server from normal to transparent mode, according to an embodiment of the invention.

FIG. 3 depicts a flowchart that describes the operation of a function that transitions a server from normal to transparent mode, according to an embodiment of the invention. Control begins at block 300. Control then continues to block 305 where the controller 196 receives a command to transition the server 125 from normal mode to transparent mode. In an embodiment, the controller 196 may present a prompt or message to the user explaining that changes will be made to the server 125 and requesting confirmation before proceeding.

Control then continues to block 310 where the controller 196 receives a network address (e.g., network address 195 in FIG. 2). In an embodiment, the network address may be an IP address. In an embodiment, the controller 196 may receive the network address from a user, but in another embodiment any appropriate means of receiving or generating the network address may be used. Control then continues to block 315 where the controller 196 fails over any high availability applications. Control then continues to block 320 where the controller clears or deletes the current router configuration. Control then continues to block 325 where the controller 196 sets the valuables for configuration parameters.

Control then continues to block 330 where the controller 196 creates a new instance (e.g., router instance 194 in FIG. 2), gives the router instance a name, and configures the interface to the network 120 with the network address previously received at block 310. Control then continues to block 335 where the controller 196 configures the new router instance to allow access by all hosts, so that the device 135 will control its own access instead of the server 125 controlling access to the device. In an embodiment, the controller 196 may allow all hosts to access the device 135 via an access control list. But, in another embodiment any appropriate means for allowing access to the device 135 may be used.

Control then continues to block 340 where the server 125 reboots. Control then continues to block 399 where the function returns.

Figure 4:
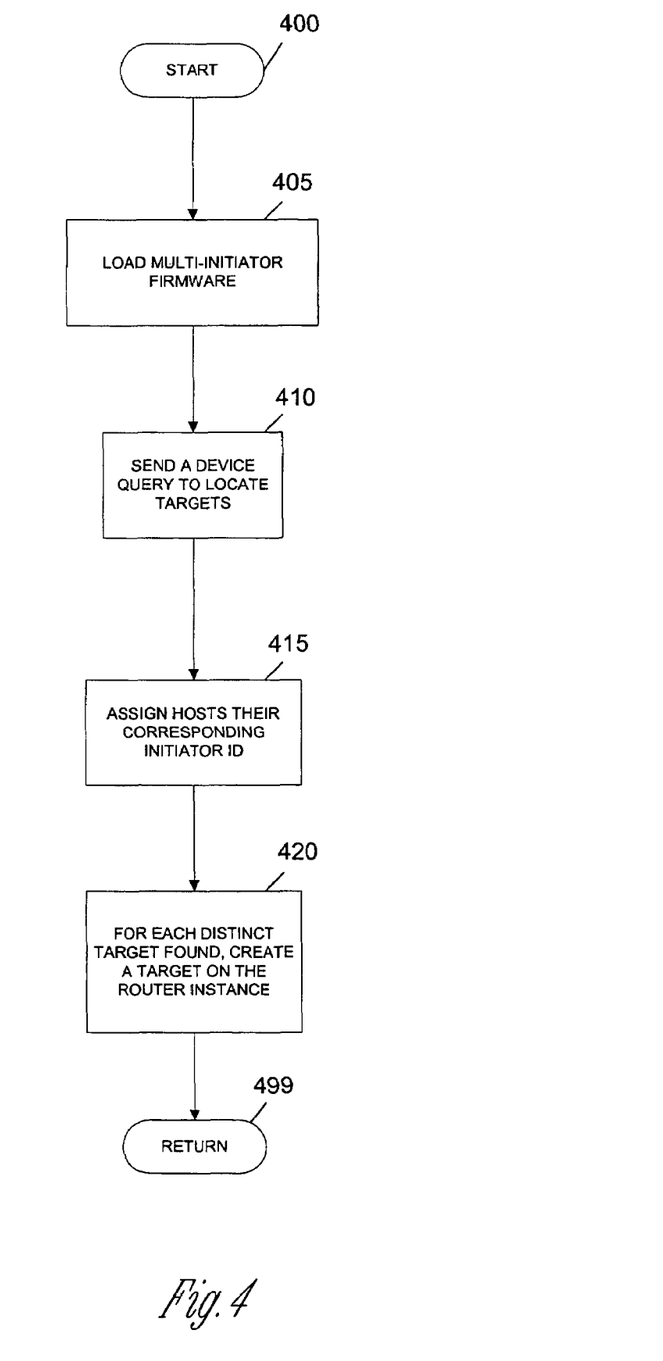
FIG. 4 depicts a flowchart that describes the operation of function that initializes a server in transparent mode following a reboot, according to an embodiment of the invention.

FIG. 4 depicts a flowchart that describes the operation of function that initializes a server in transparent mode following a reboot, according to an embodiment of the invention. Control begins at block 400. Control then continues to block 405 where the router 194 loads multi-initiator firmware that supports the virtual ports 181. Control then continues to block 410 where the router 194 sends a device query (e.g., using virtual port 282 in FIG. 2) to the device 135 to locate target ports (e.g., ports 284 and 286 in FIG. 2) for the device 135. Control then continues to block 415 where the router 194 assigns hosts their corresponding initiator identifiers by assigning one of the virtual ports 181 to the host. Control then continues to block 420 where the router 194, for each target port found in the device 135, creates a target data structure (e.g., targets 275A and/or 275B in FIG. 2) associated with the router instance (e.g., router instance 194 in FIG. 2). Control then continues to block 499 where the function returns.

Figure 5:
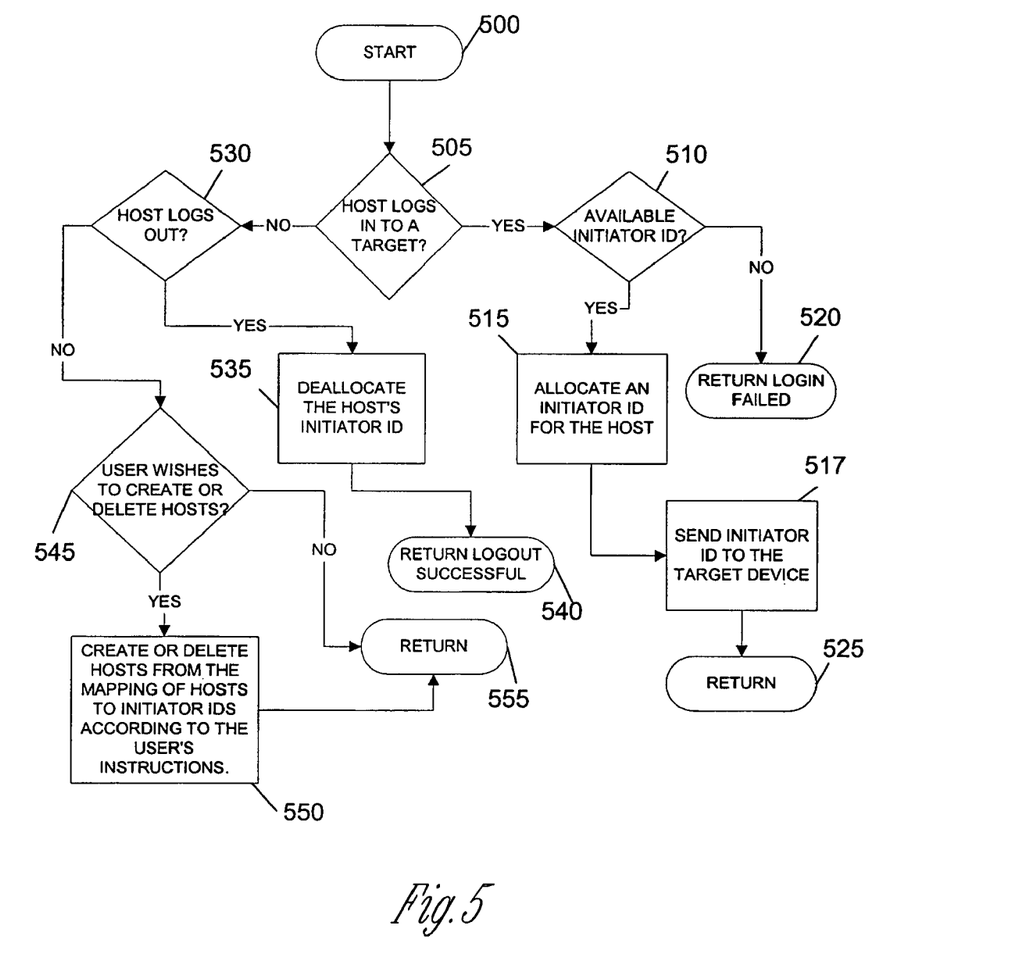
FIG. 5 depicts a flowchart that describes the operation of a function that processes an event during transparent mode, according to an embodiment of the invention.

FIG. 5 depicts a flowchart that describes the operation of a function that processes events during transparent mode, according to an embodiment of the invention. Control begins at block 500. Control then continues to block 505 where the router 194 determines whether a host has requested to log into a target. If the determination at block 505 is true, then control then continues to block 510 where the router 194 determines whether an initiator identifier is available. If the determination at block 510 is true, then control continues to block 515 where the router 194 allocates an initiator identifier for the host. Control then continues to block 517 where the router 194 sends the initiator identifier for the host to the target device to identify the host. Control then continues to block 525 where the function returns.

If the determination at block 510 is false, then control continues to block 520 where the router 194 returns that the login failed since no initiator identifiers are available.

If the determination at block 505 is false, then control continues to block 530 where the router 194 determines whether the host has requested to log out. If the determination at block 530 is true, then control continues to block 535 where the router 194 deallocates the host's initiator identifier, so that the identifier may be reused in the future. Control then continues to block 540 where the function returns.

If the determination at block 530 is false, then control continues to block 545 where the router 194 determines whether the user wishes to create or delete host mappings. If the determination at block 545 is true, then control continues to block 550 where the router 194 creates or deletes mappings of hosts to initiator identifiers according to the user's instructions. Control then continues to block 555 where the function returns.

If the determination at block 545 is false, then control continues to block 555 where the function returns.

What is claimed is:

1. A method for use in a server having a controller, a router and a plurality of virtual ports including one or more dedicated first virtual ports, the method comprising:
    placing the router in a normal mode with a first router configuration;
    discovering one or more target ports associated with a target device while in the first router configuration, wherein discovering includes initiating a device query from within the router to the target device via the one or more dedicated first virtual ports;
    creating, for each target port discovered in response to the device query, a target data structure, wherein the target data structure includes a target name that represents the target device;
    determining if a second virtual port from the plurality of virtual ports is available for communication between the target device and a first host, wherein the second virtual ports is a different port from the dedicated first virtual ports;
    while in the normal mode, dynamically allocating by the router the second virtual port to the first host via the target data structure if the second virtual port is available for communication between the target device and the first host, wherein dynamically allocating includes preventing hosts other than the first host from accessing the target device;
    receiving a command to transition the router from the normal mode to a transparent mode; and
    transitioning the router from the normal mode to the transparent mode, wherein transitioning includes replacing the first router configuration with a transparent mode router configuration, wherein, while in transparent mode, the router allows two or more hosts to access the same target device.

2. The method of claim 1, wherein
    the target name is determined based on a target port name of a corresponding target port associated with the target device.

3. The method of claim 1, wherein the dynamically allocating further comprises:
    creating an initiator identifier for the first host based on a port number of the dynamically-allocated second virtual port and a media access control address.

4. The method of claim 3, further comprising:
    sending the initiator identifier to the target device.

5. The method of claim 1, wherein the plurality of virtual ports are coupled to a physical port.

6. The method of claim 1, further comprising:
    deallocating the second virtual port.

7. The method of claim 1, further comprising:
    saving a mapping of the first host to the second virtual port.

8. The method of claim 7, further comprising:
    deleting the first host from the mapping in response to a user request.

9. The method of claim 7, further comprising:
    adding a second host to the mapping in response to a user request.

10. An apparatus comprising:
    a memory
    a plurality of virtual ports including one or more dedicated first virtual ports;
    means for placing the apparatus in a normal mode with a first router configuration;
    means for discovering one or more target ports associated with a target device while in the first router configuration, wherein the means for discovering includes means for initiating a device query from the apparatus to the target device via the one or more dedicated first virtual ports;
    means for creating, for each target port discovered in response to the device query, a target data structure, wherein the target data structure includes a target name that represents the target device;
    means for determining if a second virtual port from the plurality of virtual ports is available for communication between the target device and a first host;
    means for dynamically allocating the second virtual port to the first host via the target data structure if the second virtual port is available for communication between the target device and the first host, while in a normal mode; and
    means for, upon receipt of a command to transition the apparatus from the normal mode to a transparent mode, transitioning the apparatus from the normal mode to the transparent mode, wherein the transparent mode has a transparent mode router configuration and allows the target device to control an access between the host and the target device instead of the apparatus controlling the access.

11. The apparatus of claim 10, wherein
    target name is determined based on a target port name of a corresponding target port associated with the target device.

12. The apparatus of claim 10, wherein the means for dynamically allocating further comprises:

means for creating an initiator identifier for the host based on a port number of the dynamically-allocated second virtual port and a media access control address.

13. A computer readable storage medium storing instructions thereon that, when executed by a computer, cause the computer to perform:
placing a router in a normal mode with a first router configuration;
discovering in the router one or more target ports associated with a target device while in the first router configuration, wherein discovering includes initiating a device query from within the router to the target device via the one or more dedicated first virtual ports out of a plurality of virtual ports;
creating, for each target port discovered in response to the device query, a target data structure, wherein the target data structure includes a target name that represents the target device;
determining if a second virtual port from the plurality of virtual ports is available for communication between the target device and a first host;
while in the normal mode, dynamically allocating by the router the second virtual port to the first host via the target data structure if the second virtual port is available for communication between the target device and the first host; and
transitioning, upon receipt of a command to transition the router from the normal mode to the transparent mode, the router from the normal mode to the transparent mode, wherein the transparent mode has a transparent mode router configuration and allows the target device to control an access between the first host and the target device instead of the server controlling the access.

14. The computer readable storage medium of claim 13, wherein
the target name is determined based on a target port name of a corresponding target port associated with the target device.

15. The computer readable storage medium of claim 13, wherein the dynamically allocating further comprises:
creating an initiator identifier for the first host based on a port number of the dynamically-allocated second virtual port and a media access control address.

16. The computer readable storage medium of claim 15, further comprising:
sending the initiator identifier to the target device.

17. The computer readable storage medium of claim 13, wherein the plurality of virtual ports are coupled to a physical port.

18. The computer readable storage medium of claim 13, further comprising:
deallocating the second virtual port.

19. The computer readable storage medium of claim 13, further comprising:
saving a mapping of the first host to second virtual port.

20. The computer readable storage medium of claim 19, further comprising:
deleting the first host from the mapping in response to a user request.

21. The computer readable storage medium of claim 19, further comprising:
adding a second port host to mapping in response to a user request.

22. A server comprising:
a memory;
a network interface to couple the server to a network;
a plurality of virtual ports including one or more dedicated first virtual ports; and
a router operatively coupled to the network device and the plurality of virtual ports, wherein the router is capable of:
operating in a normal mode with a first router configuration;
discovering one or more target ports associated with a target device while in the first router configuration, wherein the means for discovering includes initiating a device query to the target device via the one or more dedicated first virtual ports;
creating, for each target port discovered in response to the device query, a target data structure, wherein the target data structure includes a target name that represents the target device;
determining if a second virtual port from the plurality of virtual ports is available for communication between the target device and a first host, wherein the second virtual port is not one of the dedicated first virtual ports;
while in the normal mode, dynamically allocating the second virtual port to the first host via the target data structure if the second virtual port is available for communication between the target device and the first host; and
receiving a command to transition from the normal mode to a transparent mode;
transitioning from the normal mode to the transparent mode, wherein the transparent mode has a transparent mode router configuration and provides an access between the first host and the target device such that the target device controls the access.

23. The server of claim 22, wherein
the target name is determined based on a target port name of a corresponding target port associated with the target device.

24. The server of claim 22, wherein the allocating further comprises:
creating an initiator identifier for the first host based on a port number of the dynamically-allocated second virtual port and a media access control address.

25. The server of claim 24, further comprising:
sending the initiator identifier to the target device.

26. The server of claim 22, wherein the plurality of virtual ports are coupled to a physical port.

27. The server of claim 22, further comprising:
deallocating the second virtual port.

28. The server of claim 22, further comprising:
saving a mapping of the first host to the second virtual port.

29. The server of claim 28, further comprising:
deleting the first host from the mapping in response to a user request.

30. The server of claim 28, further comprising:
adding a second host to the mapping in response to a user request.

31. The server of claim 22, wherein the target device comprises a storage device.

32. The server of claim 22, wherein the target device supports a SCSI command set.

33. The server of claim 22, wherein the target device comprises a Fibre Channel device.

34. The server of claim 22, wherein the first host comprises an iSCSI host.

35. The server of claim 22, wherein the server is a gateway between the first host and the target device.

* * * * *

UNITED STATES PATENT AND TRADEMARK OFFICE
CERTIFICATE OF CORRECTION

| | | |
|---|---|---|
| PATENT NO. | : 7,577,735 B1 | Page 1 of 1 |
| APPLICATION NO. | : 10/306144 | |
| DATED | : August 18, 2009 | |
| INVENTOR(S) | : Stephen P. De Groote et al. | |

It is certified that error appears in the above-identified patent and that said Letters Patent is hereby corrected as shown below:

In column 7, line 57, in Claim 1, delete "ports" and insert -- port --, therefor.

In column 8, line 11, in Claim 3, before "dynamically" delete "the".

In column 8, line 31, in Claim 10, delete "memory" and insert -- memory; --, therefor.

In column 8, line 48, in Claim 10, before "host" delete "first".

In column 8, line 50, in Claim 10, before "host" delete "first".

In column 8, line 52, in Claim 10, before "host" delete "first".

In column 9, line 12, in Claim 13, after "via" delete "the".

In column 9, line 28, in Claim 13, before "transparent" delete "the" and insert -- a --, therefor.

In column 9, lines 29-30, in Claim 13, after "mode," delete "the router from the normal mode to the transparent mode,".

In column 9, line 55, in Claim 19, before "second" insert -- the --.

In column 9, line 62, in Claim 21, before "host" delete "port".

In column 9, line 62, in Claim 21, before "mapping" insert -- the --.

In column 10, line 10, in Claim 22, before "discovering" delete "the means for".

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,577,735 B1
APPLICATION NO. : 10/306144
DATED : August 18, 2009
INVENTOR(S) : De Groote et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Seventh Day of September, 2010

David J. Kappos
*Director of the United States Patent and Trademark Office*